United States Patent [19]

Yin

[11] Patent Number: 4,562,461
[45] Date of Patent: Dec. 31, 1985

[54] DISPLAY APPARATUS AND METHOD THEREFOR

[76] Inventor: Ronald L. Yin, 2045 Sea Cliff Way, San Bruno, Calif. 94066

[21] Appl. No.: 422,741

[22] Filed: Sep. 24, 1982

Related U.S. Application Data

[63] Continuation-in-part of Ser. No. 309,820, Oct. 8, 1981, abandoned.

[51] Int. Cl.$^4$ .............................................. H04N 5/74
[52] U.S. Cl. ...................... 358/60; 358/63; 358/231
[58] Field of Search ................ 358/56, 59, 60, 61, 358/63–65, 230–232, 237, 211; 313/495–497; 250/213 R, 213 VT

[56] References Cited

U.S. PATENT DOCUMENTS

| | | | |
|---|---|---|---|
| 2,349,298 | 5/1944 | Okolicsanyi | 178/7.3 |
| 2,605,335 | 7/1952 | Greenwood, Jr. et al. | 177/318 |
| 2,888,513 | 5/1959 | Melamed et al. | 178/5.4 |
| 3,666,881 | 5/1972 | Stein | 178/5.4 BD |
| 3,760,096 | 9/1973 | Roth | 178/5.4 |
| 4,076,994 | 2/1978 | Anderson | 313/422 |
| 4,208,577 | 6/1980 | Wang | 250/213 |

FOREIGN PATENT DOCUMENTS 134551 10/1979 Japan ......................... 250/213 VT

OTHER PUBLICATIONS

RCA *Electro-Optics Handbook*, 1974, p. 174.
William V. Smith, *Laser Applications*, 1970, p. 34–35, Artech House Inc., Dedham, Mass.
*The Way Things Work*, 1967, p. 166–169, Simon & Schuster, New York.

*Primary Examiner*—Michael A. Masinick

[57] ABSTRACT

A method and an apparatus is disclosed for converting a video signal to a visual display on a device (10). The device (10) comprises an electromagnetic beam generator (12). An electro-optic modulator (14) modulates the beam (11) in response to the video signal. The beam (11) is focused and delivered to impinge a photocathode screen (36) in an evacuated envelope (30). Within the envelope (30), spaced apart from the photocathode screen (36) is a phosphor screen (38). The photoelectrons released from the photocathode (36) are accelerated and directed to impinge the phosphor screen (38).

36 Claims, 15 Drawing Figures

DISPLAY APPARATUS AND METHOD THEREFOR

DESCRIPTION

This is a continuation-in-part application of a copending application Ser. No. 309,820 filed Oct. 8, 1981, now abandoned.

TECHNICAL FIELD

The present invention relates to a display apparatus and, more particularly, to a large area display apparatus for converting a video signal into a visual display. The present application also relates to a method therefor.

BACKGROUND ART

Apparatuses for visually displaying an electrical video signal are well known in the art. A notable example is the cathode ray tube (CRT). The CRT is a raster scan device in which sequential electrical signals are received by the CRT and are displayed sequentially on a screen. The sequential displaying of the electrical signals is so fast, coupled with the persistance of the phosphor on the CRT, that an image which is suitable for viewing is created on the screen. Although the CRT has found wide acceptance in displaying television type electrical signals, its noteworthy shortcoming is that it cannot be made economically to provide a large viewing area. In particular, for large viewing area such as 100 cm×75 cm, the CRT must be so large and weigh so much in order to withstand the impact of an implosion, that the CRT cannot be employed in such application.

The principle upon which the CRT operates, i.e., cathodoluminescence, whereby electrons are emitted and are accelerated to a phosphor screen impinging thereon to create the visual display, is particularly well suited for visually displaying television type signals. A cathodoluminescent display provides high resolution as well as brightness of the image on the screen. Thus, for large area screen viewing it is desirable to use the principle of cathodoluminescence.

U.S. Pat. No. 4,076,994 discloses a type of display tube based on cathodoluminescence that is suitable for large screen application. The apparatus disclosed therein, however, requires an evacuated envelope containing a source to generate electrons and to direct them in paths and to guide them and to deflect them toward a phosphor screen. The structure required to direct, guide, and confine the electrons within an evacuated envelope appears to complicate the apparatus.

Another approach which has been used for large area viewing is by projecting the image on a large screen. However, such technique suffers from the disadvantages of a lack of sharpness in the image and of low intensity or low brightness of the image. In addition, in some cases, the brightness of the image is also dependent upon the angle of viewing.

Image tubes are well known in the art. An image tube is an electron device that reproduces on its fluorescent screen an image of the radiation pattern focused on its photosensitive surface. These tubes are used when it is desired to have an output image that is brighter than the input image or to convert non-visible radiation from an image into a visible display. Typically, however, most image tubes have diameter sizes of 18, 25 and 40 mm and do not have the capability of displaying a color image.

One type of an image tube is called the "proximity focus" tube, in which the photocathode and the phosphor screen are in parallel planes spaced closely together. In this type of apparatus an entire image is directed at a photocathode, releasing photoelectrons. The photoelectrons are directed at the phosphor screen; they are not focused but because of the high field between the phosphor screen and the photocathode, they do not deviate much from trajectories that are parallel to the tube's axis. However, the tube is small and the screen image erect, but the resolution is not as good as that for other types of image tubes employing focusing means. (See RCA Electro-Optics Hand Book, 1974 page 173–180.) U.S. Pat. No. 4,208,577 discloses a "proximity type" amplifier tube for amplifying an x-ray image.

An image tube employing a plurality of stages to magnify the image, using focusing means such as magnetic or electrostatic field, is also well known.

Lasers and laser scanning systems are also well known in the art. In *Laser Applications* by William V. Smith, published by Artech House, Inc., Dedham, Mass. (1970), reference is made to a television type display by projecting a laser beam on to a screen and scanning the beam in the two dimensions, with the eye integrating the raster of spots. However, the power requirement for a home movie type screen is about five (5) watts, which requires input power of ten kilowatts. The article concluded ". . . and, of course, the requirements for large screen projection are still more severe. Thus television type applications await the development of more efficient visible lasers. If these embrace a proper combination of colors, color television is a natural embodiment." (p. 35).

DISCLOSURE OF THE INVENTION

In the present invention, an apparatus is provided for converting an electrical signal into a visual display. The apparatus comprises means for generating a beam of electro-magnetic radiation. The beam is modulated by the electrical signal. The modulated beam is directed to impinge a particular location on a photocathode screen. The photocathode screen is within an evacuated envelope. Additionally, within the evacuated envelope is a phosphor screen. The photocathode screen releases photoelectrons in response to the modulated beam of electro-magnetic radiation impinging thereon. The photoelectrons are accelerated and impinge the phosphor screen. The phosphor screen releases electromagnetic radiation in response to the photoelectrons impinging thereon. The modulated beam is moved across the surface of the photocathode causing electromagnetic radiation to be produced from different parts of the phosphor screen, forming the visual display.

The present application also relates to a method of converting an electrical signal into a visual display.

BRIEF DESCRIPTION OF THE DRAWINGS

FIG. 6(A–E) are cross-sectional views of various embodiments of the evacuated tube portion of the apparatus of the present invention.

DETAILED DESCRIPTION OF THE DRAWINGS

Figure 1:
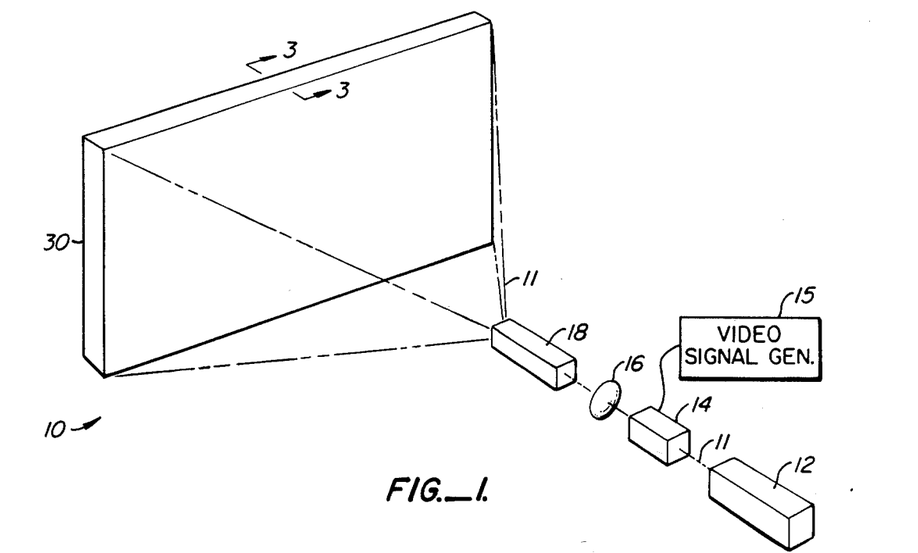
FIG. 1 is a perspective view of the apparatus of the present invention.

Referring to FIG. 1 there is shown an apparatus 10 of the present invention. The apparatus 10 comprises a laser generator 12, which can generate a beam 11 of coherent electro-magnetic radiation. The electromagnetic radiation can be of any frequency. However, as an example, the laser generator 12 is a He-Ne laser and is chosen to generate a beam 11 of laser light at 0.6328 micrometer having a power output of 50 milliwatts.

The beam 11 is incident upon an electro-optic modulator 14. A typical electro-optic modulator 14 is a birefringent crystal. In addition, $LiNbO_3$, utilizing a shear wave, in which an acoustic wave is used to deflect the beam 11 can also be used as the electro-optic modulator 14. The electro-optic modulator 14 can receive an electrical signal and modulate the amplitude or the intensity of the beam 11 based on the signal. The signal can be from a video signal generator 15, such as from a TV receiver.

Figure 2:
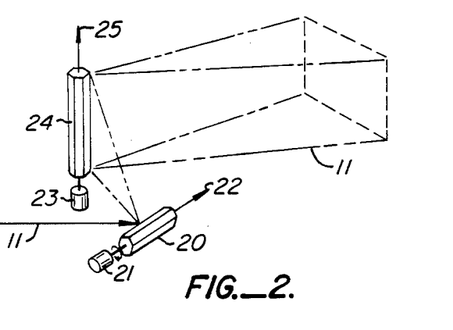
FIG. 2 is a perspective view of a scanning system, which is suitable for use in the apparatus of the present invention.

From the electro-optic modulator 14, the beam 11 is focused by a focusing lens 16. The focusing lens 16 focuses the beam 11 through an X-Y deflector 18. As seen in FIG. 2, the X-Y deflector 18 comprises two mirrors, a first mirror 20 and a second mirror 24. Each mirror is rotated by a motor; a first motor 21 rotates the first mirror 20 while a second motor 23 rotates the second mirror 24. The axis of rotation 22 of the first mirror 20 is orthogonal or perpendicular to the axis of rotation 25 of the second mirror 24. The beam 11 is aligned to impinge the first rotating mirror 20, to reflect therefrom, to impinge the second mirror 24, resulting in the beam 11 being scanned in two dimensions: a horizontal dimension and a vertical dimension.

From the X-Y deflector 18, the beam 11 is aligned to impinge the evacuated envelope 30. The rate at which the beam 11 is scanned across the horizontal direction and the vertical direction of the evacuated envelope 30 is determined by the number of mirror surfaces of the first mirror 20 and of the second mirror 24 and of their respective rates of rotation. Such scanning system is well known in the art. In addition, of course, other types of deflectors, such as electro-optic deflectors, can also be used.

Figure 3:
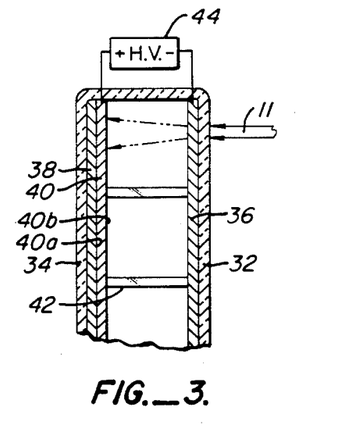
FIG. 3 is a cross sectional view taken along the line 3—3, of the evacuated tube, which is a portion of the apparatus of the present invention.

The evacuated envelope 30 comprises two substantially transparent, closely spaced, parallel walls: a first wall 32 and a second wall 34. A transmissive type photocathode screen 36 is immediately adjacent to and substantially coextensive with the inner surface of the first wall 32 within the evacuated envelope 30. The beam 11 is aligned to impinge the first wall 32 to pass therethrough and to impinge the photocathode screen 36. The X-Y deflector 18 directs the beam 11 to a particular location on the surface of the photocathode screen 36.

From the photocathode screen 36, photoelectrons are emitted by the photocathode 36 in response to electromagnetic radiation impinging thereon. For a photocathode 36 responsive to a beam of electromagnetic radiation operating at 0.6328 micrometers, the photocathode 36 can be a material that is designated as 119 by RCA Corporation. (See RCA Photomultiplier Manual, 1970.) At a frequency of 0.6328 micrometer and an incident power of 50 milliwatts, a 119 type photocathode would respond by releasing approximately 2 milliamps of photoelectrons.

Spaced apart (typically on the order of 1.0 to 2.5 centimeters) but immediately adjacent to the first wall 32 is a second wall 34. A phosphor screen 38 is immediately adjacent to and substantially coextensive with the inner surface of the second wall 38. Immediately adjacent to and substantially coextensive with the opposite side of the phosphor 38 is a thin aluminum screen 40. The photoelectrons released by the photocathode 36 are directed to impinge the aluminum screen 40 to pass therethrough and to impinge the phosphor screen 38 and to release visible electromagnetic radiation therefrom. The photoelectrons travel a trajectory generally defined by the dotted line shown greatly exaggerated in FIG. 3.

The electrons released from the photocathode 36 are accelerated by a high voltage potential applied between the aluminum screen 40 and the photocathode 36 by a high voltage source 44. Typically this is on the order of 25 to 50 KV. The aluminum screen 40 permits electrical contact to be made with the phosphor screen 38 by the high voltage source 44. In addition, the one side 40a of the aluminum screen 40, the side immediately adjacent to the phosphor screen 38 reflects any backscattered visible radiation from the phosphor screen 38 through the second wall 34. The other side 40b of the aluminum screen 40, the side facing the photocathode 36, is darkened to reduce the reflection of any light from the beam 11, that has passed through the photocathode 36.

The photoelectrons from the photocathode 36 are accelerated towards the phosphor screen 38 and upon impingement with the phosphor screen 38, the electrons convert the energy into visible radiation. Because the phosphor screen 38 is substantially parallel to the photocathode 36 and is of substantially the same size, there is a one-to-one correspondence between locations on the photocathode 36 to locations on the phosphor screen 38. By moving the beam 11 across the surface of the photocathode 36, different corresponding locations of the phosphor screen 38 are excited. An image is thus formed on the phosphor screen 38. A viewer would see the image displayed on the apparatus 10 in front of the second wall 34.

Because the evacuated envelope 30 is of a large area, for example, 100 cm. × 75 cm., internal support walls 42 are needed to support the evacuated envelope 30, to prevent an implosion of the envelope 30 due to atmospheric pressure. These walls 42 are a plurality of spaced, substantially parallel, support walls that extend perpendicularly between the one wall 32 and the second wall 34.

In the operation of the apparatus 10 of the present invention, a beam 11 of laser light is generated by the generator 12. The beam 11 is passed through an electro-optic modulator 14 and the amplitude of the beam 11 is modulated by the electro-optic modulator 14 based upon the signal received, as for example from a TV receiver 15. Other sources for video signal include videotape recorder or the output of a character generator connected to a computer. The electric signal from the TV receiver 15 is typically of sequential electrical signals in a plurality of lines which define a field of an image. In the U.S., each image comprises 525 lines forming a frame which is comprised of two interleaving fields. A field is formed every 1/60th of a second. These standards are well known in the television industry.

The deflector 18 must deflect the beam 11 across the photocathode screen 36 in a horizontal direction at substantially the same rate as the rate of the line received from the TV receiver 15. The deflector 18 must also reflect the beam 11 across the photocathode screen 36 in a vertical direction at substantially the same rate as the rate of the field, which is defined by the signal from TV receiver 15. Thus, the deflector 18 must move or scan the beam 11 across the entire surface of the photocathode screen 36 to produce an image on the phosphor screen 38 which is the visual output of the electrical signal from the TV receiver 15.

If the X-Y deflector 18 is comprised of electro-optic deflectors, the beam 11 can be directed to a particular location or locations on the photocathode screen 36. With the apparatus 10 having the capability of directly displaying video signals in particular locations, the apparatus 10 is particularly suited to be used as the visual output for a computer with direct addressing.

At each particular location on the photocathode screen 36 where light impinges thereon, i.e., the electro-optic modulator 14 has permitted the beam 11 to pass therethrough based on the video signal, photoelectrons released by the photocathode 36 are accelerated by the high voltage 44 and pass through the aluminum screen 40 to impinge the phosphor screen 38. The image that is displayed at the phosphor screen 38 is comprised of a plurality of pixels, with each pixel on the phosphor screen 38 having a corresponding pixel on the photocathode 36.

Figure 5:
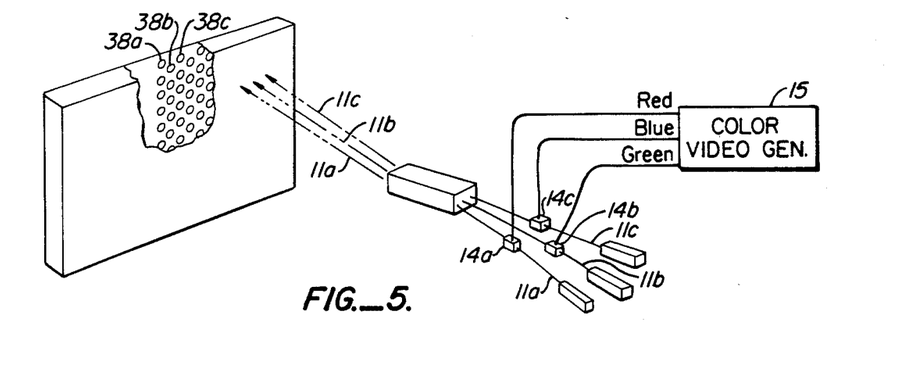
FIG. 5 is a partially cut away perspective view of another embodiment of the apparatus of the present invention, suitable for displaying a color image.

The pixels are defined areas on the phosphor screen 38. The pixels can be contiguous or they can be separated from one another. If the pixels of the phosphor screen 38 are separated from one another, as shown in FIG. 5, a plurality of different phosphors can be deposited on the different pixels, e.g. 38(a-c). These different phosphors produce different colors in response to the electrons impinging thereon. For example, phosphors producing the colors of red, blue and green, can be used in order that the apparatus 10 can display color images, in accordance with well known color principles such as that presently used in color CRT's. In such event, three beams 11(a-c) of laser light with their respective electro-optic modulators 14(a-c), may be required in order that each beam 11(a-c) impinges only pixels with a certain type of phosphor. Three different color signals from the color video source 15 are used to modulate each of the three beams of light 11(a-c).

Analogous to the Apple Tube CRT demonstrated by Philco-Ford in 1956 in which a single electron beam was used to display color images, the apparatus 10 of the present invention can also display color images using a single beam of laser light.

Figure 4:
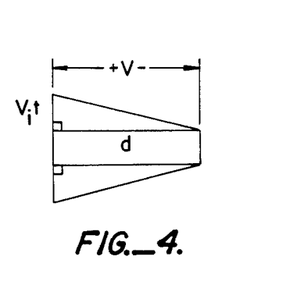
FIG. 4 is a schematic side view showing the divergence of the photoelectrons from the photocathode screen to the phosphor screen.

In general, because the photoelectrons from the photocathode 36 within the evacuated envelope 30 are not focused as they are accelerated towards the phosphor screen 38, there is a slight divergence of the beam, as shown greatly exaggerated by the dotted line in FIG. 3, as the photoelectrons travel the distance between the photocathode screen 36 and the phosphor screen 38. The amount of divergence can be approximately calculated as follows:

The maximum divergence occurs when the photoelectrons are released with a velocity $V_i$ perpendicular to the direction from the photocathode 36 to the phosphor screen 38.

The maximum amount of time for the photoelectrons to traverse the distance from the photocathode 36 to the phosphor screen 38 is $$\tfrac{1}{2}at^2 - d = 0$$

where:

$$a = ev/md$$

and
a—acceleratin of electron
e—charge of electron
v—applied high voltage
d—distance between phosphor screen 38 and photocathode screen 36
m—mass of electron
t—time for electron to travel the distance d
Solving for t and substituting for a $$t = d\sqrt{\frac{2m}{ev}}$$

The amount of divergence is $$\frac{V_i t}{d} = V_i \sqrt{\frac{2m}{ev}}$$

A further approximation can be made based upon $$\tfrac{1}{2}mV_i^2 = (hv - \phi)$$

or $mV_i^2 = 2(hv - \phi) = 1$ electron-volt then: $$\frac{V_i t}{d} = \sqrt{\frac{2}{ev}}$$

"Cross-talk" is the overlap of a portion of one pixel with its immediate adjacent pixel on the phosphor screen 38 caused, in part, by the divergence of the beam of photoelectrons. "Cross-talk" results in poor resolution.

Figure 6A:
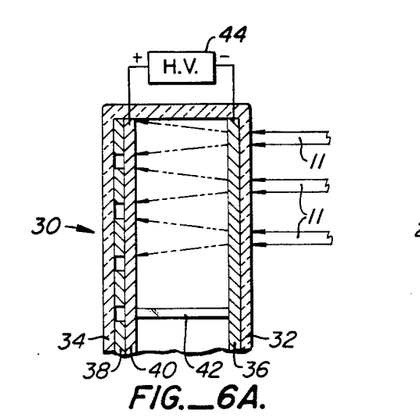

One way of eliminating or reducing "cross-talk" that is caused by the divergence of the photoelectron beam, is to impinge the beam 11 on the photocathode screen 36 in a plurality of spaced apart, discrete locations, as shown in FIG. 6A. The cross-sectional area of the beam 11 impinging on the photocathode 36 in each location must be smaller than the cross-sectional area of the corresponding location on the phosphor screen 38 to permit the divergence of the electron beam as it travels from the photo-cathode screen 36 to the phosphor screen 38. The gap between each adjacent locations where beam 11 impinges the photocathode screen 36 is chosen such that the immediate adjacent pixels of the image formed at the phosphor screen 38 are sufficiently close to one another, without any overlap. The beam 11 can be circularly shaped or in any other shape.

Figure 6B:
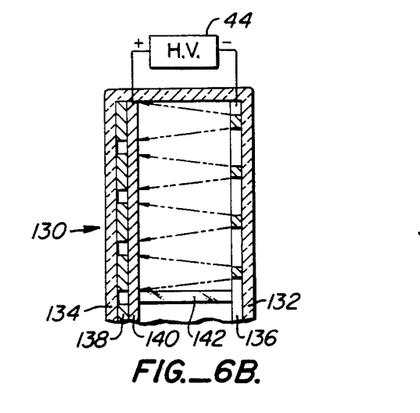

Referring to FIG. 6B there is shown one variation of the evacuated envelope 130 of the apparatus of the present invention. The evacuated envelope 130 comprises a first wall 132 and a second wall 134, all as previously described. The phosphor screen 138 is a segmented phosphor screen. It is located immediately adjacent to and substantially coextensive with the inner surface of the second wall 134. An aluminum screen 140 is located similar to the aluminum screen 40 of FIG. 3.

The photocathode 136 comprises a segmented photocathode screen. The segments or the islands of the photocathode 136 are in substantial registration with the segments of the phosphor screen 138. However, each segment of the photocathode 36 is smaller in area than the area of the corresponding segment of the phosphor screen 38, with which it is in registry. This permits divergence of the photoelectron beam. In addition, the segments can be of any shape. In this manner, although the cross sectional area of the beam 11 incident upon the photo-cathode 136 can be larger than the cross sectional area of one segment of the photocathode 136, so long as the beam 11 impinges upon only one segment of the photocathode 136, only the electrons from that segment of the photocathode 136 are emitted and are accelerated towards the segmented phosphor screen 138.

Figure 6C:
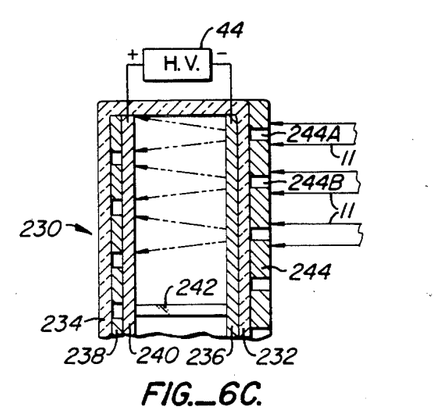

Referring to FIG. 6C there is shown another variation of the evacuated envelope 230 of the apparatus of the present invention. The evacuated envelope 230 comprises a first wall 232, a second wall 234, a segemented phosphor screen 238, an aluminum screen 240, and a photocathode screen 236 all as previously described. The evacuated envelope 230 further comprises an optical mask 244 immediately adjacent to and substantially coextensive with the outer surface of the one wall 232. The optical mask 244 has a plurality of holes 244A, 244B, etc. The holes of the mask 244 are in substantial registration with the segments of the phosphor screen 238. The function of the holes 244 is to limit the amount of light impinging upon the photocathode screen 236. In this manner, a cross sectional area of the amount of light incident upon the photocathode 236 is restricted by the cross sectional area of the hole of the optical mask 244. The relationship of the cross sectional area of the hole of the optical mask 244 and of the cross sectional area of each segment of the phosphor screen 238 is similar to that discussed for the embodiment shown in FIG. 6B.

Figure 6D:
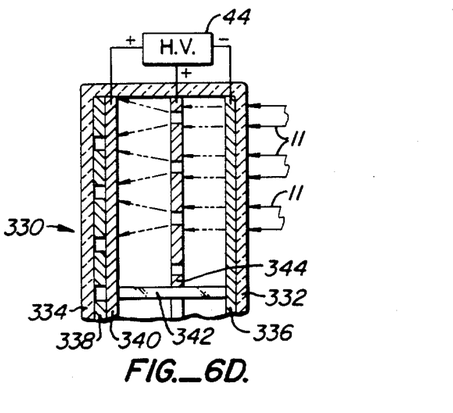

Referring to FIG. 6D there is shown yet another embodiment of the evacuated envelope 330 of the apparatus 10 of the present invention. The evacuated envelope 330 comprises a first wall 332, a second wall 334, a segmented phosphor screen 338, an aluminum screen 340, and a photocathode 336. In addition, the evacuated envelope 330 comprises an electrical mask 344 within the evacuated envelope 330 interposed between the photocathode screen 336 and the segmented phosphor screen 338. The electrical mask 344 has a plurality of holes therein. The holes of the electrical mask 344 are in substantial registration with the segments of the segmented phosphor screen 338. The function of the holes of the electrical mask 344 is to limit the cross sectional area of the beam of electrons that can be passed therethrough from the photocathode screen 336 to the phosphor screen 338. Each hole of the electrical mask 344 limits the cross sectional area of the beam current from the photocathode 336 to each segment of the phosphor screen 338. The cross sectional area of each hole of the electrical screen 344 depends on the relative position of the electrical mask 344 in relationship to the photocathode screen 336 and the phosphor screen 338. With the electrical mask 344 substantially near the phosphor screen 338, each hole of the electrical mask 344 would be substantially of the same size and shape as each segment of the phosphor screen 338. On the other hand, if the electrical mask 344 were closer to the photocathode screen 336, then the size of each hole of the electrical mask 344 would approximate the hole of the optical mask 244 shown in FIG. 6C.

One advantage of using the electrical mask 344 is that an electrical potential can be applied between the electrical mask 344 and the photocathode 336 while a second potential can be applied between the phosphor screen 338 and the electrical mask 344. The variation in the electrical potential that can be applied between the phosphor screen 338, the electrical mask 344, and a photocathode 336 can cause somewhat of a focusing action on the electrons released from the photocathode 336 directed to the phosphor screen 338.

Figure 6E:
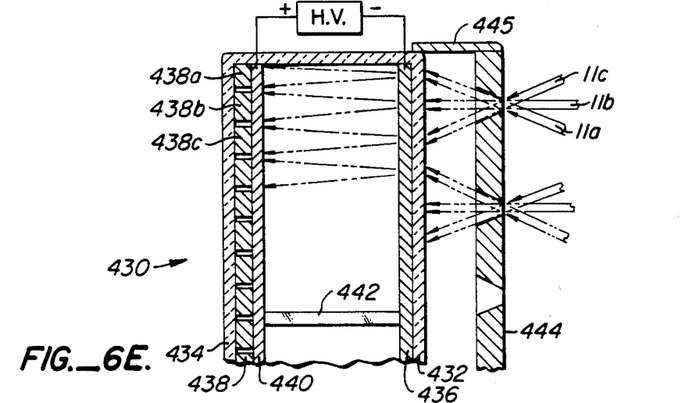

Referring to FIG. 6E, there is shown an embodiment of the evacuated envelope 430, which is particularly suitable for displaying color images. The evacuated envelope 430 comprises a first wall 432, a second wall 434, a segmented phosphor screen 438, an aluminum screen 440 and a photocathode 436, all as previously described. The phosphor screen 438 has deposited thereon, three phosphor compositions (438a, 438b, and 438c) which emit the colors of red, blue and green in response to electrons impinging thereon. An optical mask 444, having a plurality of holes 444A, 444B, etc. is located parallel to but spaced apart from the outer surface of the one wall 432.

Three beams of modulated light, 11a, 11b and 11c impinge each hole of the optical mask 444. All three beams impinge each hole at a different angle. Thus, all three beams pass through each hole but each beam impinges a different location on the photocathode 326. The electrons emitted at each location of the photocathode 436 are accelerated and impinge the different phosphor compositions. The beams of modulated light are aligned such that each beam impinges only those locations on the photocathode 436 that would excite one phosphor composition. The modulation of one beam of light, thus, modulates one color on the phosphor screen 438.

The advantage of having an optical mask 444 spaced apart from the outer surface of the one wall 432 is that the beams of modulated light do not have to be precisely focused at the photocathode 436. Each hole of the optical mask 444 limits the size of the beam that passses through the hole and impinge the photocathode 436.

The optical mask 444 can be held by a bracket 445, spaced from the evacuated envelope 430. Alternatively, the optical mask 444 can be placed within the evacuated envelope 430, spaced apart from the photocathode 436.

To reduce or to eliminate the problem of cross talk between the adjacent pixels of visual display caused by the divergence of the photoelectron beam, any one of the foregoing five mentioned embodiments can be employed.

It should be recognized that in the embodiments shown in FIG. 6(A–D) the phosphor screen 38, 138, 238 and 338 need not be a segmented phosphor screen. The phosphor screen can be a continuous screen and the "segments" which are in registry with the segments of the photocathode 136 (FIG. 6B), or the holes of the optical mask 244 (FIG. 6C), or the holes of the electrical mask 344 (FIG. 6D), can simply be the pixels of the intended area of viewing. In other words, the segments can be simply the defined areas in the image as seen by the viewer. However, a segmented phosphor screen is necessary to display color images.

Figure 7:
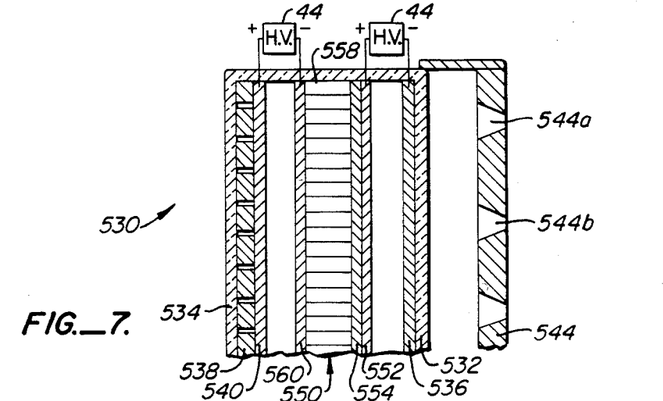
FIG. 7 is a cross-sectional view of the evacuated tube portion of another embodiment of the present invention.

Referring to FIG. 7, there is shown another embodiment of the evacuated envelope 530. The evacuated envelope 530 comprises a first wall 532, a second wall 534, a segmented phosphor screen 538, an aluminum screen 540, and a photocathode 536, all as previously described. The phosphor screen 538 has deposited thereon three phosphor compositions (538a, 538b, and 538c) which emit the colors of red, blue and the green in response to electrons impinging thereon. An optical mask 544, having a plurality of holes 544a, 544b, etc. is located parallel to, but spaced apart from the outer surface of the one wall 532.

The evacuated envelope 530 also comprises an electron amplifier section 550 disposed between the photocathode 536 and the aluminum screen 540. The electron amplifier 550 comprises a second aluminum screen 552, a second phosphor screen 554, a fiber optic plate 558, and a second photocathode screen 560. The second aluminum screen 552 is positioned adjacent and parallel to, but spaced apart from, the photocathode 536. Immediately adjacent to and substantially co-extensive with the side of the second aluminum screen 552, facing away from the photocathode 536, is the second phosphor screen 554. The fiber optic plate 558 is immediately adjacent to and substantially co-extensive with the side of the second phosphor screen 554 opposite the second aluminum screen 552. Finally, the second photocathode screen 560 is immediately adjacent to and substantially co-extensive with the side of the fiber optic plate 558 opposite the second phosphor screen 554. The second photocathode screen 560 is immediately adjacent to, but spaced apart from, the aluminum screen 540.

In the operation of the evacuated envelope 530, electrons are released from the photocathode screen 536 by the action of light impinging thereon. The electrons are accelerated and are directed to impinge the second aluminum screen 552, to pass therethrough and to impinge the second phosphor screen 554. When the electrons from the photocathode 536 impinge the second phosphor screen 554, light is emitted. The emitted light is transmitted by the fiber optic 558 and impinges the second photocathode 560. Electrons released from the second photo-cathode screen 560 are accelerated and aligned to impinge the aluminum screen 540 to pass therethrough, and to impinge the phosphor screen 538. The impingement of the electrons from the second photocathode screen 560 on the phosphor screen 538 produces the desired display for viewing.

The advantage of the evacuated envelope 530 is that with the electron multiplier section 550, a low power laser source can be used. A low power source is desired for several reasons. The first is that it is less costly. Secondly, and more importantly, is that it is safer. In particular, with the evacuated envelope 530, a one milliwatt He-Ne laser generating a beam 11 of light at 0.6328 micrometer can be used. The photocathode screen 536 can be a 119-type photocathode. The second phosphor screen 554 can be a P16 Jedec designation type of phosphor. The second photocathode screen 560 can be of a material that is designated as 116 by RCA Corporation (See RCA Photomultiplier Manual, 1970.). Finally, the phosphor screen 538 can be of the well-known phosphor type that is suitable for displaying images, as currently used in CRT's. Between the photocathode screen 536 and the second phosphor screen 554 is a voltage potential on the order of 25 Kv. Between the second photocathode screen 560 and the phosphor screen 538 is also a voltage potential on the order of 25 Kv.

Figure 8:
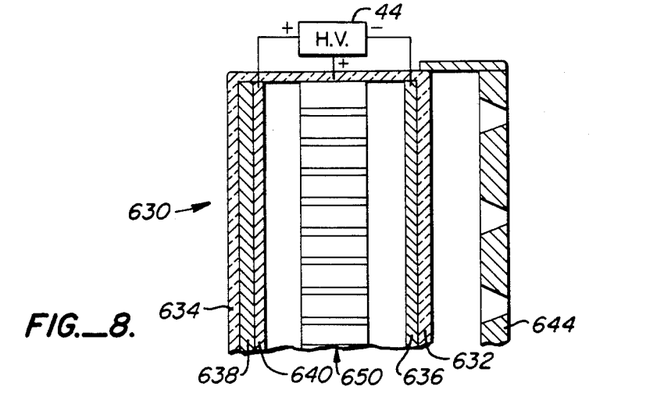
FIG. 8 is a cross-sectional view of the evacuated tube portion of yet another embodiment of the present invention.

Referring To FIG. 8, there is shown yet another evacuated envelope 630 used in the apparatus of the present invention. The evacuated envelope 630 comprises a first wall 632, a second wall 634, a phosphor screen 638, an aluminum screen 640, and a photocathode 636, all as previously described. Between the photocathode screen 636 and the aluminum screen 640 is an electron multiplier 650. The electron multiplier 650 is of the type commonly designated as a microchannel plate. The microchannel plate is a dynode. A voltage potential is applied between the microchannel plate 650 and the photocathode screen 636 and between the aluminum screen 640 and the microchannel plate 650.

The function of the microchannel plate 650 is to increase the number of electrons that enter into the microchannel plate 650 from the photocathode 636. The multiplied electrons from the microchannel plate 650 are then accelerated and directed to impinge the phosphor screen 638.

Similar to the evacuated envelope 530, the evacuated envelope 630 has the advantage that a low power laser light can be used.

Figure 9:
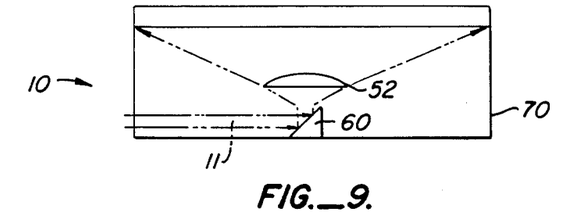
FIG. 9 is a top view of the optics portion of the present invention.

Referring to FIG. 9 there is shown the apparatus 10 of the present invention wherein the apparatus 10 is encased in a relatively narrow enclosure 70. The beam 11 of electro-magnetic radiation is directed at a 45 degree prism 50. The beam reflected therefrom is passed through a refractive lens 52 which is then incident upon the evacuated tube 30 on the one wall 32 thereof. The beam 11 is reflected from the prism 50 at substantially 90 degrees to the incident beam on the prism 50. For wide refraction of the beam 11 from the refractive lens 52, thereby enabling the apparatus 10 to be encased in a narrow enclosure 70, the lens 52 can be of a type known as "fish eye" lens. If the incident beam 11 is a laser light which is monochromatic, the fish-eye lens 52 can be made economically as it needs to refract only that frequency of light.

Figure 10:
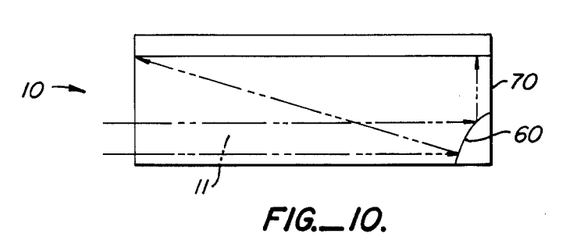
FIG. 10 is a top view of another embodiment of the optics portion of the apparatus of the present invention.

Referring to FIG. 10 there is shown yet another variation of the optical element that is used to encase the apparatus 10 within a narrow enclosure 70. The beam 11 from the laser generator 12 is incident upon a concave shaped reflector 60. The concave shaped reflector 60 reflects the beam therefrom and directs the reflected beam onto the one wall 32 of the evacuated envelope 30. The concave shaped reflector 60 can be near one corner of the enclosure 70 and thus the beam 11 incident thereon would be reflected therefrom at substantially 90 degrees.

Figure 11:
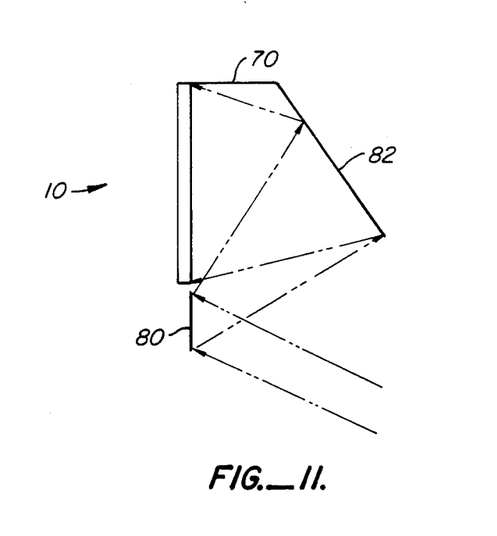
FIG. 11 is a side view of still yet another embodiment of the optics portion of the apparatus of the present invention.

Referring to FIG. 11 there is shown yet another optical element which confines the apparatus 10 within a narrow enclosure 70. The beam 11 from the laser generator 12 impinges a first mirror surface 80 and reflects therefrom onto a second mirror surface 82 and reflects therefrom to impinge the one wall 32 of the evacuated envelope 30. The second mirror 82 directs the beam 11 substantially from the bottom of the enclosure 70 and reflects it onto the one wall 32 of the evacuated envelope 30.

In general, any source of light can be used in place of the laser generator 12. Other sources of high intensity light include tungsten-halogen slit lamp. A laser is chosen because it is of one frequency and thus the modulation thereof is easier. In addition, a laser beam has spatial coherence, i.e., in delivering the beam 11 from the laser 12 to the evacuated envelope 30, the beam 11 does not spread, except due to converging or diverging lenses placed in the beam path. Finally, of course, a laser beam has the advantage in that it is high intense concentrated light. The electro-optic modulator 14 can be of any type, so long as the signal from the TV receiver 15 or whatever source, can be used to modulate the amplitude of the particular frequency of light beam 11 that is used. In addition, the electro-optic modulator 14 can also be a frequency modulator, changing the frequency of the light beam 11. Since the photocathode screen 36 is frequency sensitive, modulating the frequency of the light impinging thereon also modulates the photoelectron beam current released therefrom. If a laser beam is used, the focussing lens 16 might not be necessary because the beam has spatial coherence. As previously described, the X-Y deflector 18 can be of any type, such as two rotating mirrors or solid state electro optic deflectors. The function of the X-Y deflector 18 is merely to direct the beam 11 onto a particular location on the first wall of the evacuated envelope 30.

If the X-Y deflector 18 is of solid state electro-optic deflectors, then the deflector 18 can direct the beam randomly to any location on the surface of the first wall 32 of the evacuated envelope 30. The shape of the evacuated envelope 30 is also insignificant. The evacuated envelope 30 can comprise two spaced parallel walls, or the envelope 30 can comprise two spaced curved walls. The only requirement is that the photocathode screen and the phosphor screen are substantially equidistant from one another, or that they are spaced apart at a constant distance. The display 10 would then be a curved screen. The size of the evacuated envelope 30 can vary. If the size of the envelope 30 is small (e.g. 38 cm × 50 cm or less) then internal support walls 42 are not needed. The material that is used to manufacture the envelope 30 can be glass or any other material having high strength to withstand the atmospheric pressure. The photocathode screen 36 is chosen to maximize the amount of electrons released therefrom in response to the particular frequency of the light impinging thereon. Thus, the spectral response of the photocathode is dependent upon the particular frequency of the light used. Finally, the phosphor screen is made from well known material and can produce visible light in response to the photoelectrons impinging thereon. The high voltage source 44 is also of well known design.

Therefore, with the method and the apparatus of the present invention, a large area screen which is suited for the visual display of electrical signals, and in particular of video electrical signals, such as from television receivers, is made. Unlike the projection type system, the present invention offers brightness of image and higher resolution. Unlike the guided beam concept, the present invention offers simplicity in design and manufacturing thereof. In the method and apparatus of the present invention, the video signal is modulated and delivered onto a two dimensional screen by optical means. With optical modulation and delivery, this portion of the apparatus does not have to be in an evacuated envelope, thereby simplifying the construction of the apparatus. The only portion of the apparatus which must be within an evacuated envelope is the photocathode screen and the phosphor screen, which serves to amplify the modulated signal. Unlike the direct projection of a laser beam onto a screen, the present invention does not require a huge power output laser. Moreover, the frequency of the laser beam can be visible or invisible. The photocathode screen, responsive to the frequency of the laser light, converts it into an electron beam which is then converted into visible radiation by the phosphor screen. Therefore, even in a color system, the modulated laser beams representing the three colors, can all be the output of the same laser, which may even be in the invisible spectrum. Finally, the apparatus of the present invention can be used as a high resolution display device. The number of horizontal lines can be significantly greater than 525. Thus, a high resolution display device is achieved.

What is claimed is:

1. A method of converting an electrical signal into a visual display, said method comprising:

generating a beam of light;

modulating said beam by said electrical signal to produce a modulated beam;

optically masking said modulated beam by an optical mask to produce a masked modulated beam;

impinging said masked modulated beam at a two dimension photocathode screen in an evacuated envelope;

releasing electrons from said photocathode screen in response to said masked modulated beam;

accelerating said electrons to a two dimension phosphor screen in said envelope, said phosphor screen defining a plurality of pixels;

releasing visible light from said phosphor screen in response to electrons impinging thereon; and moving said modulated beam causing said masked modulated beam to impinging said photocathode screen in different locations;

whereby said masked means reduces cross-talk between adjacent pixels and the movement of said masked modulated beam forms said visual display on said phosphor screen.

2. The method of claim 1 further comprising the step of:

impinging said electrons from said photocathode screen at said phosphor screen.

3. The method of claim 1 further comprising the steps of:

multiplying said electrons from said photocathode screen; and impinging said multiplied electrons at said phophor screen.

4. The method of claim 3, wherein said multiplying step further comprises the steps of:

accelerating said electrons from said photocathode screen to impinge a second phosphor screen;

converting said electrons into electromagnetic radiation by said second phosphor screen;

converting said electromagnetic radiation from said second phosphor screen into said multiplied electrons by a second photocathode screen; and accelerating said multiplied electrons.

5. The method of claim 3, wherein said multiplying step further comprises the steps of:

impinging said electrons from said photocathode screen at a dynode;

releasing said multiplied electrons from said dynode; and accelerating said multiplied electrons.

6. The method of claim 1 or 3, wherein said phosphor screen comprises a plurality of different phosphor compositions, each phosphor composition releasing visible light of a color different from the other in response to electrons impinging thereon.

7. The method of claim 6, wherein said phosphor screen comprises three different phosphor compositions.

8. The method of claim 7 further comprising:
generating three beams of visible light;
modulating each beam by said electrical signal; and
aligning each beam to pass through said mask means and to impinge said photocathode screen such that the electrons released from said photocathode screen by each beam impinge only one of said three phosphors.

9. The method of claim 8 wherein said electrical signal is a video signal having a plurality of lines defining a field.

10. The method of claim 9 wherein said moving step is:
scanning said masked modulated beam across said photocathode screen wherein said rate of scanning in one dimension is substantially the same as the rate of said line of said signal, and said rate of scanning in said other dimension is substantially the same as the rate of said field of said signal.

11. The method of claim 10 wherein said signal is the signal from a television receiver.

12. The method of claim 1 or 3 further comprising:
focusing said modulated beam on said photocathode screen.

13. An apparatus for converting an electrical signal into a visual display, said apparatus comprising:
means for generating a beam of light;
means for modulating said beam by said electrical signal;
an optical mask for optically masking said modulated beam forming a masked modulated beam;
an evacuated envelope comprising:
a photocathode screen for releasing electrons in response to light impinging thereon;
a phosphor screen positioned spaced apart from said photocathode screen for releasing visible light in response to electrons impinging thereon, said phosphor screen defining a plurality of pixels;
means for accelerating the electrons from said photocathode screen to said phosphor screen; and
means for moving said modulated beam causing said masked modulated beam to impinge said photocathode screen in different locations;
whereby said mask means reduces cross-talk between adjacent pixels and the movement of said masked modulated beam forms said visual display on said phosphor screen.

14. The apparatus of claim 13 wherein said phosphor screen releases visible light in response to the electrons from said photocathode screen impinging thereon.

15. The apparatus of claim 13 further comprising:
means for multiplying said electrons from said photocathode screen; and
said phosphor screen releases visible light in response to said multiplied electrons impinging thereon.

16. The apparatus of claim 15, wherein said multiplying means further comprising:
a second phosphor screen, in said envelope, for emitting visible light in response to said electrons from said photocathode screen impinging thereon;
a second photocathode screen, in said envelope, for emitting said multiplied electrons in response to said radiation from said second phosphor screen impinging thereon; and
means for accelerating said electrons from said photocathode screen to impinge said second phosphor screen.

17. The apparatus of claim 16, wherein said second phosphor screen and said second photocathode screen are substantially coextensive and adjacent to one another.

18. The apparatus of claim 15, wherein said multiplying means further comprising:
dynode means in said envelope for emitting said multiplied electrons in response to said electrons from said photocathode screen impinging thereon.

19. The apparatus of claim 18, wherein said dynode means is a microchannel plate electron multiplier.

20. The apparatus of claim 13 or 15 wherein said envelope further comprises:
two spaced, substantially parallel walls;
each wall of a substantially transparent material;
said photocathode screen adjacent to and substantially coextensive with the inner surface of a first wall; and
said phosphor screen adjacent to and substantially coextensive with the inner surface of a second wall.

21. The apparatus of claim 20 wherein said modulated beam is aligned to impinge said first wall of said envelope, to pass therethrough and to impinge one side of said photocathode screen and to release electrons on the opposite side of said photocathode screen.

22. The apparatus of claim 21 wherein said envelope further comprises:
a plurality of spaced, substantially parallel support walls extending substantially perpendicularly between said first and said second walls.

23. The apparatus of claim 13 or 15 wherein said masking means comprises:
an optical mask, said mask having a plurality of holes;
said modulated beam aligned to pass through said holes to impinge said photocathode screen; and
each hole of said mask being in substantial registration with each pixel of said phosphor screen.

24. The apparatus of claim 13 or 15 wherein said phosphor screen comprises a plurality of different phosphor compositions, each emitting visible light having a color different that the other phosphor compositions, in response to electrons impinging thereon.

25. The apparatus of claim 24 wherein said phosphor screen comprises three different phosphor compositions.

26. The apparatus of claim 25 further comprising:
three beams of light;
each beam modulated by said electrical signal; and
each beam aligned to impinge said photocathode screen, releasing electrons therefrom, and to impinge only one phosphor composition.

27. The apparatus of claim 26 wherein said masking means comprises:
an optical mask, spaced apart from said photocathode screen, said mask having a plurality of holes;
said three beams aligned to pass through each hole to impinge said photocathode screen.

28. The apparatus of claim 27 wherein said moving means is:

means for scanning said beam whereby said masked modulated beam scans in two dimensions across said photocathode screen.

29. The apparatus of claim 28 wherein said scanning means comprises:

two mirrors, each rotating about an axis, said axes substantially perpendicular to one another.

30. The apparatus of claim 28 wherein said scanning means comprises:

electro-optic deflectors for deflecting said beam in two substantially orthogonal directions.

31. The apparatus of claim 28 wherein said electrical signal has a plurality of lines defining a field.

32. The apparatus of claim 31 wherein said scanning means being movable causing said masked modulated beam to move in one direction across said photocathode screen in substantially the same rate as the rate of said line of said signal and being movable in a direction substantially perpendicular to said one direction causing said masked modulated beam to move in substantially the same rate as the rate of said field of said signal.

33. The apparatus of claim 32 wherein said signal is from a television receiver.

34. The apparatus of claim 13 or 15 further comprising means for focussing said modulated beam on said photocathode screen.

35. The apparatus of claim 13 or 15 wherein said modulating means is an electro-optic modulator, for modulating the amplitude of said beam.

36. An apparatus for converting an electrical signal into a visual display, said apparatus comprising:

means for generating a beam of light;

means for modulating said beam by said electrical signal;

an optical mask for optically masking said modulated beam forming a masked modulated beam;

an evacuated envelope comprising:
  a photocathode screen for releasing electrons in response to light impinging thereon;
  a phosphor screen positioned spaced apart from said photocathode screen for releasing visible light in response to electrons impinging thereon, said phosphor screen defining a plurality of pixels;

means for accelerating the electrons from said photocathode screen to said phosphor screen; and means for moving said beam causing said masked modulated beam to impinge said photocathode screen in different locations;

whereby said mask means reduces cross-talk between adjacent pixels and the movement of said masked modulated beam forms said visual display on said phosphor screen.

* * * * *